United States Patent [19]
Heid et al.

[11] 3,912,654
[45] Oct. 14, 1975

[54] USE OF PERFLUORALKYLPHOSPHORUS COMPOUNDS AS FOAM-DAMPENING AGENTS

[75] Inventors: Christian Heid, Frankfurt am Main; Dieter Hoffmann, Burghausen; Johannes Polster, Frankfurt am Main, all of Germany

[73] Assignee: Cassella Farbwerke Mainkur AG, Frankfurt, Germany

[22] Filed: July 9, 1973

[21] Appl. No.: 377,561

[30] Foreign Application Priority Data
July 11, 1972 Germany............................ 2233941

[52] U.S. Cl. ...................... 252/321; 8/90; 252/358; 252/DIG. 17
[51] Int. Cl.²......................................... B01D 19/04
[58] Field of Search............. 252/321, 358, DIG. 17; 260/502.4 R; 8/90

[56] References Cited
UNITED STATES PATENTS

| | | | |
|---|---|---|---|
| 2,394,596 | 2/1946 | Davis et al. | 252/321 X |
| 2,792,374 | 5/1957 | Bradley et al. | 252/321 X |

FOREIGN PATENTS OR APPLICATIONS

| | | | |
|---|---|---|---|
| 2,110,767 | 9/1972 | Germany | 260/502.4 R |

*Primary Examiner*—Richard D. Lovering
*Attorney, Agent, or Firm*—Connolly and Hutz

[57] ABSTRACT

Process for dampening foaming of a liquid which employs a compound of the formula $$R_{(3-x)}PO(OH)_x$$

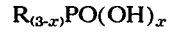

or an alkali metal or an alkali earth metal salt thereof as foam-dampening agent, R being $C_nF_{2+1}$, $n$ being an integer from 4 to 24 and $x$ being 1 or 2. The compounds used as foam-dampening agents have excellent stability with respect to heat, acid and oxidation influences, and may be applied in the pH range of 1 to 12.

4 Claims, No Drawings

USE OF PERFLUORALKYLPHOSPHORUS COMPOUNDS AS FOAM-DAMPENING AGENTS

In the execution of chemical and technical processes, wherein solutions of substances are processed which display a certain contact surface activity, there often occurs a very disturbing and undesirable formation of foam, which may even make the entire process unfeasible. Such undesirable formation of foam makes a disruptive appearance in the processing of solutions containing egg white, for example, and in wetting, padding and dyeing procedures for textiles.

The development of foam depends, among other things, on the concentration, the contact surface activity, the temperature and the extent of agitation of the solution.

Various technical and chemical processes, which contain foam producers such as certain proteins, paraffin chain salts and saponins, may be carried out only when certain substances are added which decrease or prevent the foaming. Such substances are designated as antifoaming agents, defoamers, foam-preventing agents or foam-dampening agents. Satisfactory foam-dampening agents, even with the addition of small amounts, should quell the foam quickly and permanently, should not cause any undesirable side effects and should be usable universally. The foam-dampening agents used are, for example, natural fats and oils (such as sperm oil, lard oil and fish oil), long-chain alcohols (n-octylalcohol, cetylalcohol), high molecular glycols, silicon oils, fluorine-containing non-perfluoridated compounds, triisobutylphosphate and aluminum soaps of stearic or oleic acid. Compositions of various foam-dampening agents are also used, e.g., in dyeing and printing, mixtures of higher aliphatic alcohols, esters and ketones or emulsifiable mixtures of neutral or mineral oils are used.

The previously known foam-dampening agents, particularly in their application in dyeing and printing, have a series of disadvantages. They either require large, i.e., uneconomical, quantities or they spot the material being treated or they are not resistant to the effects of heat or acid or to the influences of oxidation. To a certain extent, difficulties also arise with respect to the known foam-dampening agents in that they are either not at all soluble or they are insufficiently soluble in aqueous media.

In accordance with the present invention, compounds of the formula:

$$R_{(3-x)}PO(OH)_x \quad \text{I}$$

wherein R is $C_nF_{2n+1}$, n is an integer from 4 to 24 and x is 1 or 2 and the alkali metal and alkali earth metal salts thereof are used as foam-dampening agents, thereby avoiding the disadvantages of the previously known foam-dampening agents.

The compounds of formula I to be used as the foam-dampening agents have excellent stability with respect to heat, acid and oxidation influences and may be applied in the pH range of 1 to 12 with ionic and non-ionic foam-producing compounds, such as alkane sulfonate, olefin sulfonates, alcohol sulfates and alcohol ether sulfates; hydroxyethylation products of alcohols, acids and/or amines; quaternary ammonium compounds, etc. They are suitable for the prevention of foam formation or for the disruption of foaming in textile finishing procedures, in the paper industry, leather industry, cosmetic and pharmaceutical industry, metal industry, etc. Preferably, the use of the compounds of formula I as foam-dampening agents occurs in liquors or solutions, which are employed in the textile industry, or in solutions of anion-active or non-ionic tensides.

The compounds to be used according to this invention, individually or in a mixture, are incorporated, dissolved or undissolved, into the solutions or liquors of the foaming substances or also into solid mixtures of other substances such as tensides, dyestuffs, printing pastes, etc.

The concentrations of compounds of formula I required for use as foam dampeners are somewhere in the range of between about 0.001 g/l and 0.1 g/l. With these concentrations, the compounds have a strong foam dampening effect but do not increase the wetting power and the liquor absorption factors in the wetting and padding procedures for textiles.

The compounds of formula I, when x is 1, are phosphinic acids of the formula $R_2PO(OH)$ and, when x is 2, are phosphonic acids of the formula $RPO(OH)_2$ or salts of these phosphinic or phosphonic acids, the sodium, calcium and magnesium salts being preferred. Salts suitable for use are likewise such with tertiary ammonium bases, in particular triethanolamine. The radical R is perfluorinated, preferably unbranched, and preferably has 6 to 12 carbon atoms.

The production of the compounds of the general formula I and the salts thereof is described in German application laid open to public inspection (Deutsche Offenlegungsschrift) No. 2,110,767.

According to this process the compounds of formula I are prepared from perfluoralkylphosphorus diiodides and bis-(perfluoralkyl)-phosphorus iodides of the formulae $R PJ_2$ and $R_2 PJ$, R having the above-stated meaning. Hydrolysis of these perfluoralkyl phosphorus iodides initially produces perfluoralkyl phosphonic acids of formula II and perfluoralkyl phosphinic acids of formula III.

$$R\ P(OH)_2 \quad \text{II}$$

$$R_2P(OH) \quad \text{III}$$

These in turn may be converted with oxidizing agent into the corresponding perfluoralkyl phosphonic acids and perfluoroalkyl phosphinic acids of formula I. The oxidizing agents may be iodine, oxygen, nitric acid, chlorine and hydrogen peroxide. Hydrolysis and oxidation may be carried out at ambient temperature. Usually the perfluoralkyl phosphorus diiodide ($RPJ_2$) or a bis-(perfluoralkyl)-phosphorus iodide ($R_2PJ$) or a mixture of the two is stirred until a complete dissolution in water is achieved, then oxidation agents are added, filtered off from the eventually separated iodine and the solution is evaporated.

The compounds of formula I are usually colorless, solid compounds. The conversion of the perfluoralkyl phosphinic or phosphonic acids into the corresponding salts is accomplished by reaction with the desired base in conventional fashion.

Very small amounts of the compounds of formula I are required as foam-dampening agents and in dyeing and printing, for example, no spots are produced on the dyed or printed material. These agents are easily soluble in water and aqueous media and because of the fully fluorinated alkyl chain are relatively inert to most all chemicals. With the use of compounds of formula I, foams — particularly with respect to anionic and non-ionic foam-producing substances — are very quickly reduced and usually very quickly broken down altogether.

To test the foam-power-dampening effect of the substances of the application, the foam-beating method for determining the foaming power using a perforated disc according to DIN No. 53902/1 and the foam-determining method of Ross-Miles (DIN No. 53902/2) were employed.

The comparative substance was a compound of the formula:

$(C_6F_{13}CH_2CH_2O)_2POO^-NH_4^+$

The test results are given in the subsequent tables.

In the tables, the added and tested substances are designated 1 through 21. Substances 1 through 12 relate to compounds or compositions of compounds according to formula I. Substance 13 is the stated known foam-dampening compound. Substances 14 through 21 are known wetting agents and other tensides, complex formers as well as auxiliary agents used preponderantly in the dyeing of textiles.

Composition of the Compounds Used

1. $C_4F_9PO_3H_2 + (C_4F_9)_2PO_2H$ — equimolecular mixture
2. $C_6F_{13}PO_3H_2 + (C_6F_{13})_2PO_2H$ — equimolecular mixture
3. $C_6F_{13}PO_3H_2$
4. $(C_6F_{13})_2PO_2H$
5. $C_8F_{17}PO_3H_2 + (C_8F_{17})_2PO_2H$ — equimolecular mixture
6. $C_8F_{17}PO_3H_2$
7. $(C_8F_{17})_2PO_2H$
8. $C_{10}F_{21}PO_3H_2$
9. $(C_{10}F_{21})_2PO_2H$
10. A mixture of compounds of the formulae $C_2F_5(C_2F_4)_nPO_3H_2 + [C_2F_5(C_2F_4)_n]_2PO_2H$, compounds with $n = 2, 3$ and $4$ being present in the mixture.
11. A mixture of compounds of the formulae $C_2F_5(C_2F_4)_nPO_3H_2 + [C_2F_5(C_2F_4)_n]_2PO_2H$, compounds with $n = 4$ to $8$ being present in the mixture.
12. A mixture of compounds of the formulae $C_2F_5(C_2F_4)_nPO_3H_2 + [C_2F_5(C_2F_4)_n]_2PO_2H$, compounds with $n = 1$ to $11$ being present in the mixture.
13. $[C_6F_{13}CH_2CH_2O]_2PO_2NH_4$
14. $C_{12}$ secondary alkane sulfonate
15. Ethylene diaminotetraacetic acid 16. 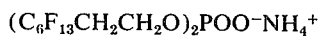

17. $Cocoalkyl-N^+H_2-CH_2COO^-$
18. $C_{12/18}$ alkyldimethylbenzylammonium chloride
19. Reaction product of cocoalkylamine + 10 ethylene oxide
20. Reaction product of isotridecylalcohol + 8 ethylene oxide
21. Cocoalkyldimethylamino oxide

TABLE 1

Extent and stability of foam according to Ross-Miles of $C_{12/18}$ sec. alkane sulfonate (1 g/l) with the addition of fluoralkylphosphorus compounds.

| Substance Added No. | g/l | T °C. | Extent of Foam (mm) (in parentheses: sec. up to decomposition of the foam) | | |
|---|---|---|---|---|---|
| | | | initially | after 120 sec. | after 300 sec. |
| None | — | 25 | 175 | 175 | 170 |
| 5 | 0.02 | 25 | 100 | 0(1) | — |
| 10 | 0.02 | 25 | 120 | 0(1) | — |
| 12 | 0.02 | 25 | 140 | 0(20) | — |
| 13 | 0.02 | 25 | 140 | 110 | 20 |
| None | — | 70 | 215 | 210 | 25 |
| 1 | 0.005 | 70 | 190 | 0(10) | — |
| 2 | 0.005 | 70 | 200 | 0(10) | — |
| 3 | 0.005 | 70 | 205 | 0(10) | — |
| 4 | 0.005 | 70 | 205 | 0(80) | — |
| 5 | 0.005 | 70 | 140 | 0(1) | — |
| 6 | 0.005 | 70 | 190 | 0(50) | — |
| 7 | 0.005 | 70 | 200 | 0(40) | — |
| 8 | 0.005 | 70 | 205 | 0 | — |
| 9 | 0.005 | 70 | 180 | 0(90) | — |
| 10 | 0.005 | 70 | 180 | 0(1) | — |
| 11 | 0.005 | 70 | 205 | 0 | — |
| 12 | 0.005 | 70 | 190 | 0(30) | — |
| 13 | 0.005 | 70 | 180 | 180 | 175 |

The foam values in the testing of Substance No. 5 as an additive to $C_{12/18}$-alkane sulfonate with the pH values 3, 5, 7, 9, 11 produced at all temperatures (up to 80°C.) and concentrations no change as compared to the data given in Table I.

TABLE 2

Extent and stability of foam according to the foam-beating method of $C_{12}/C_{18}$-secondary alkane sulfonate (0.75 g/l) adding fluorine alkyl phosphorus compounds.

| Substance Added No. | g/l | T °C. | Extent of Foam (mm) (in parentheses: sec. up to decomposition of the foam) | | |
|---|---|---|---|---|---|
| | | | initially | after 120 sec. | after 300 sec. |
| None | — | 20 | 370 | 360 | 340 |
| 4 | 0.02 | 20 | 340 | 0 | — |
| 5 | 0.02 | 20 | 180 | 0(60) | — |
| 7 | 0.02 | 20 | 300 | 0(50) | — |
| 10 | 0.02 | 20 | 190 | 0(70) | — |
| 13 | 0.02 | 20 | 330 | 280 | 190 |
| None | — | 70 | 410 | 360 | 270 |
| 4 | 0.005 | 70 | 250 | 0 | — |
| 5 | 0.005 | 70 | 190 | 0 | — |
| 7 | 0.005 | 70 | 170 | 0(100) | — |
| 10 | 0.005 | 70 | 200 | 0(90) | — |
| 13 | 0.005 | 70 | 180 | 140 | 80 |

TABLE 3

Extent and stability of foam according to Ross-Miles of $C_{12/18}$ sec. alkane sulfonate (1 g/l) depending on the amount of fluoralkylphosphorus compounds added.

| Substance Added No. | g/l | Extent of Foam (mm) (In parentheses: sec. to decomposition of foam) | | | |
|---|---|---|---|---|---|
| | | at 25°C. | | at 70°C. | |
| | | initially | after 30 sec. | initially | after 300 sec. |
| None | — | 175 | 170 | 215 | 25 |
| 5 | 0.0001 | 170 | 165 | 200 | 0(200) |
| 5 | 0.0005 | 165 | 160 | 190 | 0(110) |
| 5 | 0.001 | 160 | 155 | 190 | 0(70) |
| 5 | 0.002 | 160 | 50 | 190 | 0(20) |
| 5 | 0.005 | 160 | 0 | 135 | 0(12) |
| 5 | 0.02 | 90 | 0(1) | 25 | 0(1) |
| 5 | 0.05 | 20 | 0(1) | 25 | 0(1) |
| 13 | 0.05 | 165 | 120 | 180 | 175 |
| 13 | 0.002 | 170 | 165 | 175 | 170 |

TABLE 4

Extent and stability of foam according to Ross-Miles of various wash-active substances with the addition of fluoralkylphosphorus compounds.

| Wash-active Substance No. (1 g/l) | Substance Added No. | g/l | Extent of Foam (mm) (In parentheses: sec. up to decomposition of foam) | | | |
|---|---|---|---|---|---|---|
| | | | at 25°C. | | at 70°C. | |
| | | | initially | after 300 sec. | initially | after 120 sec. | after 300 sec. |
| 14 | — | — | 175 | 170 | 215 | 215 | 25 |
| 14 | 5 | 0.02 | 90 | 0(1) | 25 | 0(1) | — |
| 14 | 15 | 0.1 | 175 | 175 | 215 | 215 | 50 |
| 14 | 15/5 | 0.1/0.02 | 50 | 0(1) | 85 | 25 | 0 |
| 17 | — | — | 120 | 120 | 200 | 200 | 195 |
| 17 | 5 | 0.05 | 70 | 70 | 90 | 90 | 90 |
| 19 | — | — | 120 | 0 | 140 | 0(100) | — |
| 19 | 5 | 0.01 | 110 | 0(190) | 110 | 0(24) | — |
| 19 | 13 | 0.01 | 90 | 25 | 100 | 35 | 20 | tested, the foam collapsed spontaneously. The results are given in Table 5.

TABLE 5

| WAS (5 g/l) | Extent of Foam (mm) | | |
|---|---|---|---|
| | without additive | | After addition of 0.001 g substance No. 5 to the freshly formed foam |
| | initially | after 300 sec. | initially |
| 14 | 100 | 85 | 0 |
| 16 | 95 | 70 | 5 |
| 17 | 100 | 100 | 10 |
| 18 | 100 | 5 | 0 |
| 20 | 95 | 80 | 10 |
| 21 | 80 | 75 | 5 |

In the following Table 6 are compiled the results of foam tests according to the beating method at 20°C. on wetting agent and dyestuff liquors without and with the addition of Substance No. 5 (equimolecular composition of $C_8F_{17}PO_3H_2$ and $(C_8F_{17})_2PO_2H$):

TABLE 6

| Example No. | Composition of Wetting Agent or Dyestuff Liquor | Extent of Foam (ml) | |
|---|---|---|---|
| | | initially | after 300 sec. |
| (1) | 1 g/l aralkyl sulfonate (phenyl sulfonate HSR, conc.)-containing wetting agent liquor | 400 | 350 |
| (2) | As under (1) and in addition 0.01 g/l Substance No. 5 | 310 | 0 |
| (3) | 1 g/l sulfonated polyglycol ether (Genapol LRO)-containing wetting agent liquor | 380 | 360 |
| (4) | As under (3) and in addition 0.01 g/l Substance No. 5 | 350 | 0 |
| (5) | 2 g/l Disperse Orange 29<br>2 g/l ammonium sulfate-containing dispersion dyestuff liquor standardized with acetic acid to pH 5 | 290 | 250 |
| (6) | As under (5) and in addition 0.01 g/l Substance No. 5 | 110 | 0 |
| (7) | 30 g/l of Dyestuff C.I. 71025<br>8 g/l anion-active padding auxiliary agent (Casservol RW conc.)-containing vat dye padding liquor | 370 | 350 |
| (8) | As under (7) and in addition 0.01 g/l Substance No. 5 | 330 | 0 |
| (9) | 40 g/l Dyestuff C.I. 53271<br>15 g/l soda calc.<br>15 g/l sodium sulfohydrate 95 %<br>5 g/l anion-active padding auxiliary agent (Casservol AH)-containing sulfur dye padding liquor | 350 | 0 |
| (10) | As under (9) and in addition 0.01 g/l Substance No. 5 | 350 | 0 |

In further tests, the effectiveness of the fully fluorinated fluoralkylphosphorus compounds of formula I was tested by direct addition to the foam. For this purpose, 100 ml vibrating cylinders with 50 ml solution each of various wash-active substances (WAS) (5 g/l) were quickly turned 10 times about 180° and the extent of foam was read. In a repeated test, immediately after the last turning, 0.001 g solid substance No. 5 (= 0.02 g/l) were added to the foam produced. In all substances

What is claimed is:

1. In the process of dampening foaming of a liquid by the addition of foam-dampening agent thereto, the improvement which comprises employing, as foam-dampening agent, a member selected from the group consisting of

and the tertiary ammonium, alkali metal and alkali earth metal salts thereof wherein R is $C_nF_{2n+1}$, $n$ is an integer from 4 to 24 and $x$ is 1 or 2.

2. The process of claim 1 wherein $n$ is an integer of from 6 to 12 carbon atoms.

3. The process of claim 1 wherein said foamdampening agent is employed in an amount of about 0.001 to 0.1 g/l of said liquid.

4. The process of claim 1 wherein a sodium, calcium or magnesium salt of the compound of said formula is employed.

* * * * *

UNITED STATES PATENT AND TRADEMARK OFFICE
CERTIFICATE OF CORRECTION

PATENT NO. : 3,912,654
DATED : October 14, 1975
INVENTOR(S) : Christian Heid et al It is certified that error appears in the above–identified patent and that said Letters Patent are hereby corrected as shown below:

Col. 6, Example 9 of Table 6, "350" and "0" should read, respectively, -- 360 -- and -- 330 --.

Signed and Sealed this twentieth Day of April 1976

[SEAL]

Attest:

RUTH C. MASON
Attesting Officer

C. MARSHALL DANN
Commissioner of Patents and Trademarks